United States Patent [19]

Sword

[11] 4,323,273
[45] Apr. 6, 1982

[54] LINE ENDER

[76] Inventor: Alexander F. Sword, P.O. Box 27, Vernonia, Oreg. 97064

[21] Appl. No.: 179,067

[22] Filed: Aug. 18, 1980

[51] Int. Cl.³ ............................................. B66C 1/14
[52] U.S. Cl. .................... 294/78 R; 294/74; 403/353
[58] Field of Search ............ 294/74, 78 R; 24/115 R, 24/117, 119, 128, 129 R, 129 A; 403/209, 301, 305, 353

[56] References Cited

U.S. PATENT DOCUMENTS

| | | | |
|---|---|---|---|
| 1,483,516 | 2/1924 | McIntosh | 403/353 |
| 1,552,338 | 9/1925 | Munro | 403/353 |
| 1,584,830 | 5/1926 | Bardon | 403/353 X |
| 1,666,272 | 4/1928 | Spiering | 403/353 |
| 3,100,323 | 8/1963 | Baker | 403/353 |
| 3,276,809 | 10/1966 | Vaines et al. | 294/74 |
| 4,185,863 | 1/1980 | Larson et al. | 294/78 R |

*Primary Examiner*—Johnny D. Cherry

*Attorney, Agent, or Firm*—Kolisch, Hartwell & Dickinson

[57] ABSTRACT

A line ender for use in coupling an end choker line to a hauling line in a log-hauling system. The ender is formed of a unitary body having an elongate, axially extending chamber which terminates at upper and lower seats for nubbins located at the ends of the hauling and choker lines, respectively. The two lines are received through bores in associated ends in the body. An opening on one side of the ender body is dimensioned to allow the main line nubbin to move therethrough into its seat. An opening on the other side of the body is longitudinally aligned with the lower portion of the first-mentioned opening, allowing a choker nubbin to be passed transversely through the body with the hauling line nubbin in its seat. An entry slot on the lower portion of the body extends from one of the openings to the lower bore in the body in a path which revolves about a quarter of the circumference of the body, providing entry of the choker line into the bore at the lower end of the body.

4 Claims, 7 Drawing Figures

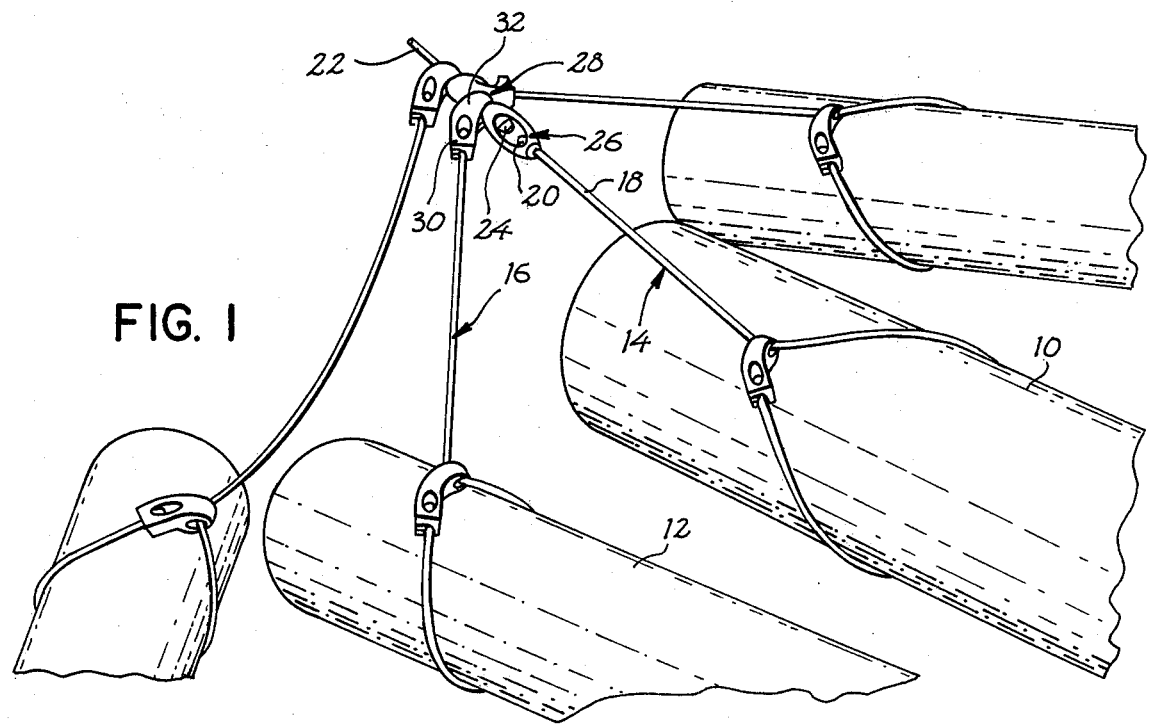
FIG. 1
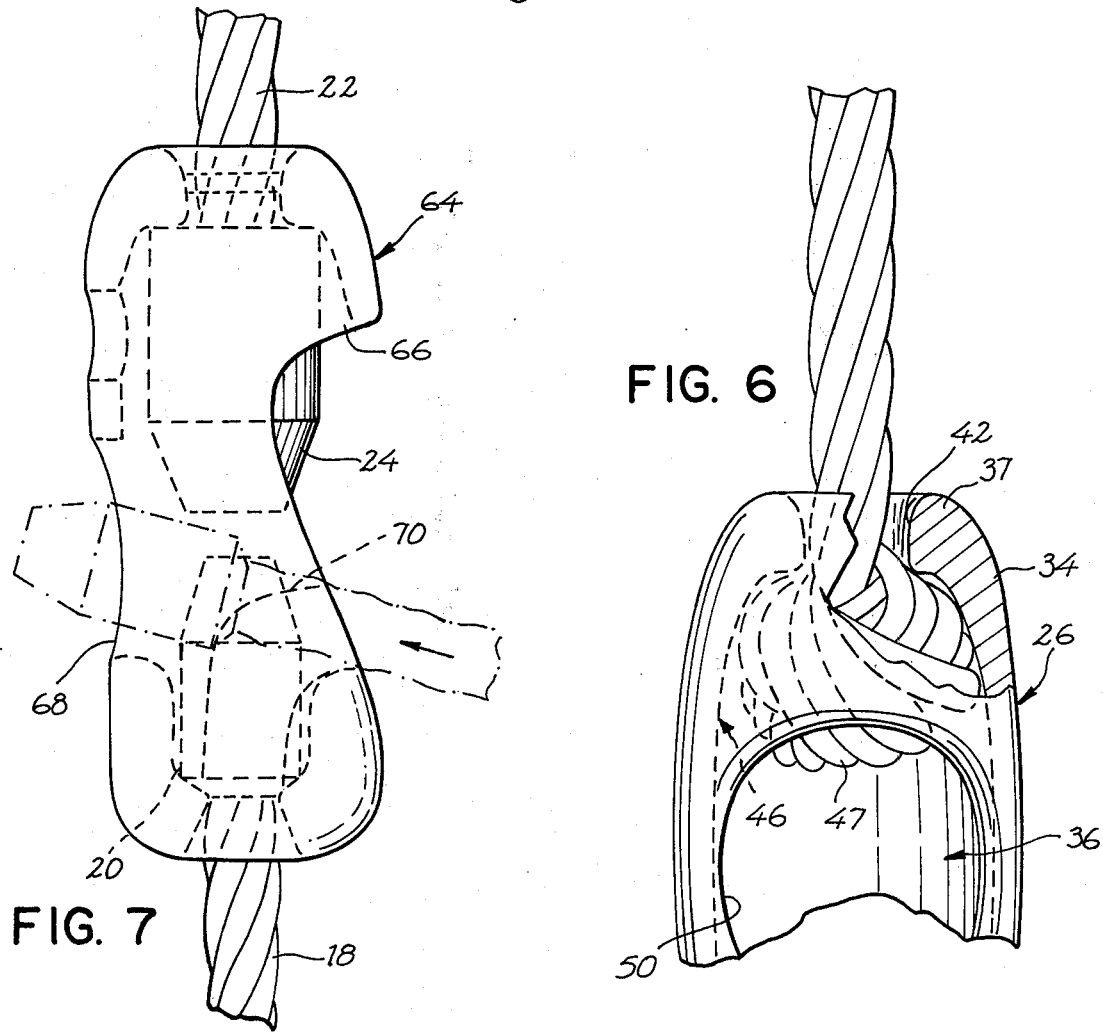
FIG. 6
FIG. 7

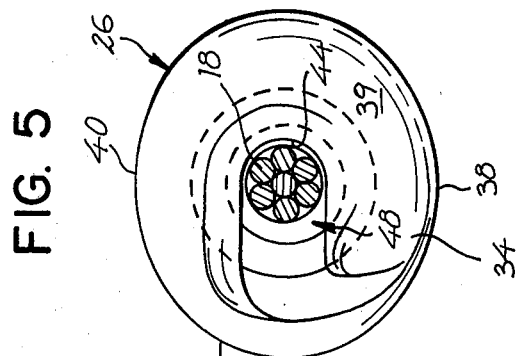
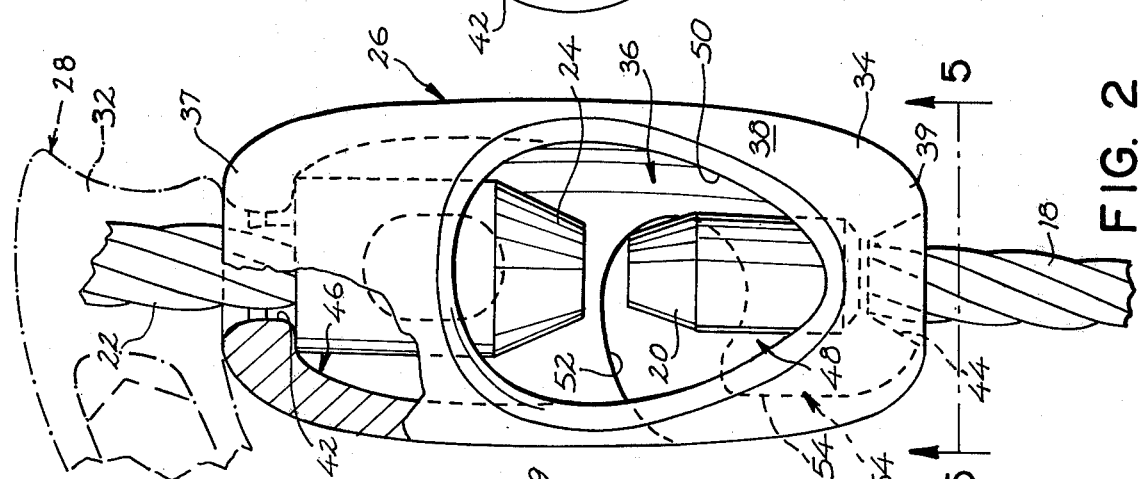
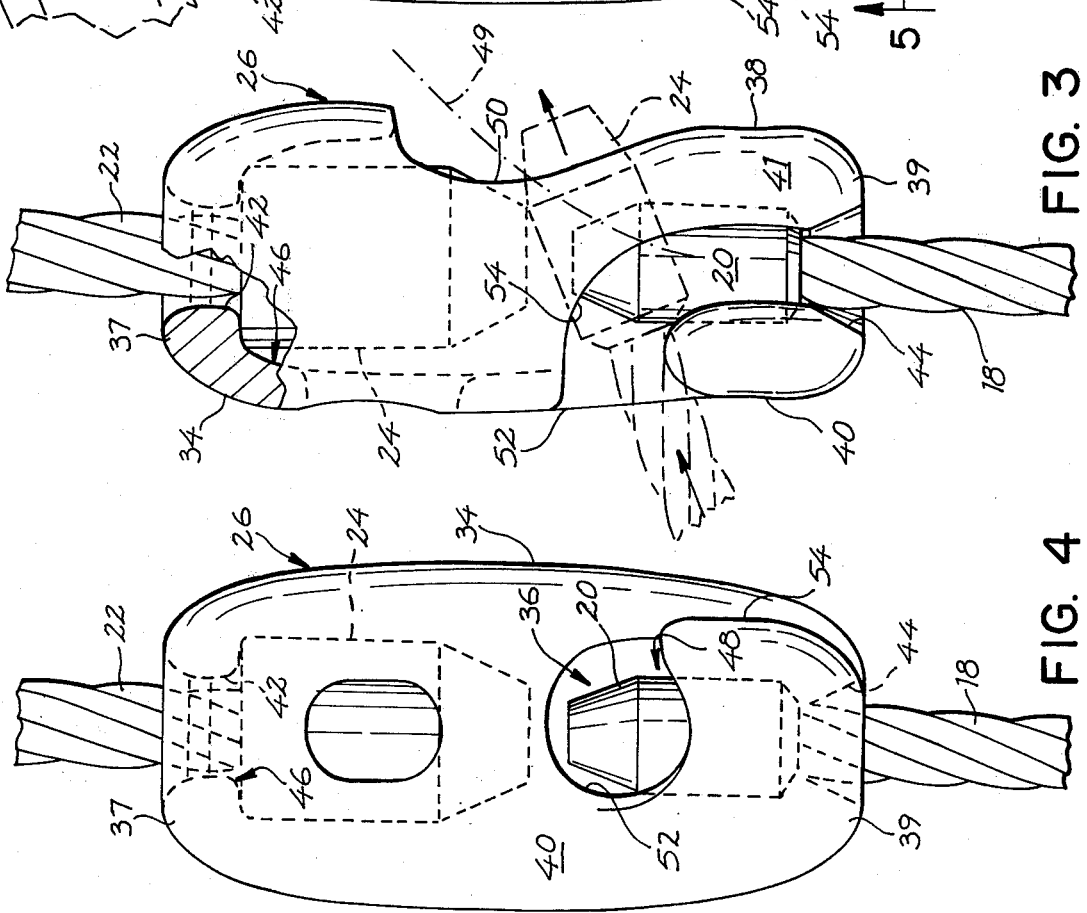

LINE ENDER

BACKGROUND AND SUMMARY

The present invention relates to apparatus for coupling a main hauling line and an end choker line in a log-hauling system, and particularly to an apparatus for coupling such lines along an axis.

In the usual log-hauling setting, a number of felled logs are attached to a main hauling line by individual choker cables which encircle the logs and which are coupled to the main hauling line by sliders which are slidable on the line. The free end of the hauling line terminates at a nubbin—either a ferrule or a knot formed at the end of the line—which acts to arrest the endmost slider when the hauling line is taken in. The construction of the usual slider is such that a portion of the hauling line adjacent the nubbin is kinked somewhat when the end choker line is placed under tension. Repeated kinking causes the hauling line to fray and break—as often as once-per-day during normal use. When a hauling line breaks in the field, a preferred repair procedure is to form a knot at the end of the line, rather than to trim the line and attach a new ferrule.

In an attempt to solve the just-mentioned kinking and line-breaking problem, coupling devices for coupling a hauling line and a choker line substantially along an axis, i.e., without kinking in either line, have been proposed. U.S. Pat. No. 4,185,863 discloses a device having axially aligned seats for hauling and choker line ferrules, and a construction such that the choker line nubbin is locked to the device when the hauling line nubbin is moved into its seat. One problem associated with this device is that the operator must first slacken the hauling line, remove the associated ferrule from the device and move the device and sliders up the hauling line before an end choker can be coupled and uncoupled to the line. This is a serious inconvenience in log hauling, and where the hauling line is frayed near its free end, is difficult to pull through the device and increases the chance that the operator will injure his hands in manipulating the ferrule in and out of the device.

Another problem associated with prior art line coupling devices, such as that disclosed in the above-mentioned U.S. Patent, is that the hauling line is received through a slot which extends from the upper end of the device to a side region thereof. This construction permits the hauling line to be shifted in the slot to the side of the device when the sliders on the hauling line are first pulled against the device. When this occurs, the hauling line may be sheared or badly kinked.

A further limitation associated with the known line-coupling devices of the type described above is that they must be used in conjunction with hauling lines equipped with ferrules. This prevents use of the devices when it is necessary or more convenient to have a knot at the end of the hauling line.

One object of the present invention therefore is to provide a line ender used in coupling a hauling line axially to a choker line which substantially overcomes above-noted problems associated with line-coupling devices in the prior art.

A more specific object of the invention is to provide such an ender which permits coupling and uncoupling of a choker line when a hauling line nubbin is seated in the ender.

Still another object of the invention is to provide such an ender which is usable with a hauling line which terminates either at a ferrule or a knot.

A further object of the invention is to provide such an ender which is constructed to insure that a slider moving on the line toward the ender is guided axially against the top of the ender.

The line ender of the present invention is formed of a body having an elongate, axially extending chamber which terminates at upper and lower seats for receiving the nubbins located at the ends of hauling and choker lines, respectively. The two lines pass through axially aligned bores extending through associated ends in the body. An opening on one side of the body is dimensioned to allow the hauling line nubbin to move therethrough into its seat. Another opening on the other side of the body transversely aligned with a lower portion of the first-mentioned opening is dimensioned to allow a choker nubbin to be passed transversely through the body, with the hauling line nubbin received in its seat. An entry slot on a lower portion of the body extends from one of the openings to the lower bore therein along a path which revolves substantially a quarter of the circumference of the body, the slot providing entry of the choker line into the lower bore.

These and other objects and features of the present invention will become more fully apparent when the following detailed description of a preferred embodiment of the invention is read in connection with the accompanying drawings, wherein:

FIG. 1 shows a line ender constructed according to the present invention as it is used in a typical log-hauling setting;

FIG. 2 is an enlarged side view of the ender in FIG. 1, also showing portions of hauling and choker lines coupled thereto, and a portion of a slider seated thereon;

FIG. 3 is a side view of the ender as it appears from the right in FIG. 2, and illustrating in dash-dot line initial movement of a choker cable into the ender to couple the choker cable thereto;

FIG. 4 is another side view of the ender as seen from the right in FIG. 3—that is, the side of the ender opposite the side seen in FIG. 2;

FIG. 5 is a bottom view of the ender seen along the line 5—5 in FIG. 2;

FIG. 6 is a fragmentary side view of the ender, viewed from the side shown in FIG. 2, illustrating a hauling line knot seated in the ender; and FIG. 7 is a side view of a second embodiment of the invention, the view corresponding to that of FIG. 3.

DETAILED DESCRIPTION OF THE INVENTION

FIG. 1 shows a portion of a log hauling setting in which the present invention is designed to be used. Shown here is a plurality of cut logs, such as logs 10, 12, which are encircled by chokers, such as chokers 14, 16, respectively. Choker 14, which is representative, includes a choker line 18 terminating at a ferrule 20 having a generally cylindrical shape and tapered head seen best in FIGS. 2 and 4.

The chokers are connected to a main hauling line 22 which is operated by the usual log-hauling equipment to haul the logs from cutting cites to a loading zone. Line 22 terminates at a ferrule 24 having the generally cylindrical shape and tapered head seen best in FIG. 2. Lines, such as lines 18, 22 and ferrules, such as ferrules, 20, 24, respectively, attached thereto, have dimensions which are standardized in the log-hauling industry.

Choker 14 is connected to line 22 by a line ender 26 constructed according to the present invention. Other chokers are connected to the hauling line by conventional sliders, such as slider 28 connecting choker 16 to the hauling line. Slider 28, which is representative, is formed of a unitary body having a hook 30 to which the choker line is releasably secured in a conventional manner and a generally circular slip sleeve 32 which is slidable on line 22. The reader is referred to U.S. Pat. No. 3,728,809 for details of such a slider.

With reference now to FIGS. 2–5, ender 26 is formed of an elongate unitary metal body 34 having the generally rounded, elongate-bead shape seen best in FIGS. 2 and 4. The upper end of the ender body is rounded for receiving the lower end of sleeve 32 in slider 28 (dash-dot lines in FIG. 2) thereagainst. For purposes of description, the exterior of body 34 may be thought of as having a pair of opposed sides 38, 40 (seen head on in FIGS. 2 and 4, respectively), separated by another pair of opposed faces such as face 41 (seen head on in FIG. 3). Body 34 has a hollow interior region forming an elongate chamber 36 which is bounded, at its upper and lower ends in FIGS. 2–4 by upper and lower end walls 37, 39, respectively, in body 34. Upper and lower axially aligned bores 42, 44, in the upper and lower end walls, respectively, of the body slidably receive hauling and choker lines 22, 18, respectively, therethrough.

With continued reference to FIGS. 2–4, the walls forming chamber 36 adjacent its upper end define an inverted, cup-shaped seat 46 dimensioned to receive ferrule 24 therein. Seat 46 includes a substantially planar annular wall portion contacted by the flat upper surface of ferrule 24 and annular side wall portions which taper, at a preferred angle of between 10° and 20° with respect to the vertical, progressing toward the upper wall portion. In FIG. 6 it can be appreciated that the taper in the wall portion forming seat 46 is such as to accommodate reception of a hauling line knot 47 snugly in the seat. Knot 47 and ferrule 24 are also separately referred to herebelow as hauling line nubbins.

A second seat 48 formed by the lower chamber walls is dimensioned to receive ferrule 20 therein, as seen best in FIGS. 2 and 4. The spacing between seats 46, 48 is such that with ferrule 24 seated in seat 46, ferrule 20 can be moved, with a near-minimum clearance between the ferrules, into its seat, substantially along the arcuate path indicated by a dash-dot line 49 in FIG. 3. Accordingly, the overall length of the ender is substantially the minimum length which permits the ender operation described herein. It is noted here that the just-mentioned spacing is such that ferrule 24 is locked in seat 46 when ferrule 20 is seated in seat 48.

A generally oval-shaped opening 50 formed in side 38 is dimensioned longitudinally to allow ferrule 24 to move therethrough in the process of seating the ferrule in seat 46. The opening is dimensioned laterally to permit passage therethrough of a knot, such as knot 47, in a hauling line. A generally circular opening 52 formed in side 40 in body 34, opposite opening 50, is dimensioned to permit passage of choker ferrule 24 transversely therethrough. Opening 52 is transversely aligned with a lower portion of opening 50, as seen in FIG. 2, permitting passage of ferrule 24 substantially transversely through the body, with ferrule 24 in seat 46, as shown by dash-dot lines in FIG. 3.

An entry slot 54 on the lower portion of body 34 extends from opening 52 to bore 44 in a path that extends substantially about a quarter of the circumference of the body, and which curves downwardly progressing from opening 52 toward bore 44, as seen best in FIG. 3.

Operation of ender 26 in a log hauling setting such as that illustrated in FIG. 1 will now be described. Initially a bare hauling line is threaded through the sleeves of several sliders, such as slider 28, and through bore 42 and opening 50 in ender 26. The line is then equipped with a nubbin such as ferrule 24 or knot 47, and pulled through opening 50 into seat 46. Where a knot is formed in the hauling line, the line and ender are relatively positioned such that a hauling line end segment below the knot will be received through an upper portion of opening 50 when the knot is seated in the ender. It is noted that such end segment does not interfere with attachment of a choker line to the ender.

With the hauling line nubbin 24 or 47 seated in the ender's upper seat, the ferrule-equipped choker cable is passed substantially transversely through the ender body, through openings 52, 50, in that order, as illustrated by dash-dot lines in FIG. 3. The choker line is then rotated, substantially in a plane normal to the ender, to place the line in slot 54, and then move into the substantially vertically extending portion of slot 54 to place the choker line in bore 44. The line is pulled downwardly substantially along path 49 (FIG. 3) to seat the choker ferrule in lower seat 48.

As line 22 is reeled in and slack in line 18 coupled to ender 26 is taken up, the hauling and end choker lines become mutually aligned with the axis of the ender. Tension in the hauling line along this axis acts to resist nonaxial forces exerted on the hauling line by the sliders on the line, thus minimizing the tendency of the line to kink. To this end, it is desired that the "end" log coupled to ender 26 through choker 14 in FIG. 1 be one of the larger logs in the group of logs to be hauled, this larger log then serving as an anchor which produces maximum tension in the hauling line. Field tests show that the ender of the present invention extends the time between which line breakage occurs, under normal use, to about once every four days. As noted above, such breakage occurs about once a day when choker sliders alone are used on a hauling line.

Often it is desirable, during log-hauling, to switch the chokers connected to the hauling line by the sliders and ender to achieve a more favorable distribution among the logs being hauled. An important advantage of the present invention is that the end choker line may be detached from the line ender and a new choker line attached thereto, without first having to remove the hauling line nubbin from the ender and having to shift the ender and sliders up the hauling line. The possibility of one of the choker cables inadvertently becoming uncoupled from a slider is thereby reduced, as is the problem of an operator injuring his hands in attempting to remove the hauling line nubbin from the ender, particularly where the ender terminates in a knot having a jagged end.

Because seat 46 in the ender is circumferentially continuous, the hauling line coupled to ender 26 is at all times held in a position of near-axial alignment with the ender, adjacent the same. This insures that a slider is always guided to a position engaging the top of the ender when the sliders are pulled against the ender as the hauling line is taken in. The ender is designed for use with a hauling line whose nubbin includes either a ferrule or a knot, permitting the ender to be used in log-hauling operations where it is more convenient to terminate the hauling line with a knot.

In FIG. 7 there is shown at 64 a line ender constructed according to a second embodiment of the invention. Ender 64 differs from ender 26 only in the location of the side openings and entry slot used in coupling a choker cable to the ender. Specifically, the ender includes an opening 66 which has the same size as opening 50 in ender 26, but is located somewhat closer to the upper end of the associated ender, such that the lower edge of opening 66 is transversely aligned with the position corresponding to the lower edge of opening 52 in ender 26. The second opening 68 in ender 64 is transversely aligned with a lower portion of opening 66, permitting a choker line to be passed transversely through the body, through openings 66, 68, in that order, with a hauling line ferrule seated in the ender, as indicated by dash-dot lines in FIGS. 7.

An entry slot 70, formed on that lower portion of ender 64 not visible in FIG. 7, extends between the lower portion of opening 66 and the lower bore in ender 64 along a path which rotates about a quarter of a circumference of the ender. The slot serves the same function as does slot 54 in ender 26—namely to permit passage of a choker line into the lower bore in the ender.

While two preferred embodiments of the present invention have been described herein, it is obvious that various changes and modifications may be made without departing from the spirit of the invention.

It is claimed and desired to secure as Letters Patent:

1. A line ender for use in connecting a hauling line terminating at a nubbin and another line terminating at a nubbin, said ender comprising
    an elongate body,
    an elongate chamber extending axially within said body,
    the walls of said chamber adjacent an upper end of said body being substantially circumferentially continuous and shaped to define an upper cup-shaped seat for the nubbin located at the end of the hauling line, said body having an upper bore extending axially therethrough connecting with the base of said seat through which the hauling line is adapted to pass,
    the walls of said chamber adjacent the lower end of said body being shaped to define a lower seat for the nubbin located at the end of the other line, said body having a lower bore extending axially therethrough connecting with said lower seat through which the other line is adapted to pass,
    a first opening in one side of said body connecting with said chamber and being of a size enabling the nubbin of the hauling line to move therethrough in the process of seating such nubbin in said upper seat,
    a second opening in the opposite side of said body connecting with said chamber, transversely aligned with a lower portion of said first opening, said second opening and the lower portion of said first opening being of sizes enabling the nubbin of the other line to be passed transversely through said body, with the nubbin of the hauling line seated in said upper seat, and
    an entry slot on the lower portion of said body extending from one of said openings to said lower bore in a path extending along the side of said body which revolves substantially about a quarter of the circumference of the body, said slot connecting said chamber with the exterior of said body and providing entry of the other line into said lower bore.

2. The line ender of claim 1, wherein the walls of said chamber defining said upper seat taper progressing toward said upper bore to accommodate seating in said upper seat of a nubbin formed by a knot in the hauling line.

3. In combination with a hauling line terminating in a nubbin and another line terminating in a nubbin, a line ender comprising
    an elongate body having a chamber extending axially therein,
    the walls of said chamber at an upper end of said body being substantially circumferentially continuous and shaped to define an upper cup-shaped seat for said nubbin on the hauling line, said body having an upper bore extending axially therethrough connecting with the base of said upper seat through which said hauling line passes,
    the walls of said chamber at the lower end of said body defining a lower seat for said nubbin of said other line, said body having a lower bore extending axially therethrough connecting with said lower seat through which said other line passes,
    a first opening in one side of said body connecting with said chamber of a size enabling said nubbin of the hauling line to move therethrough in the process of seating such nubbin in said upper seat,
    a second opening in the opposite side of said body connecting with said chamber transversely aligned with a lower portion of said first opening, said second opening and the lower portion of said first opening having sizes enabling the nubbin of said other line to be passed transversely through said body with the nubbin of the hauling line seated in said upper seat, and
    an entry slot on the lower portion of said body extending from one of said openings to said lower bore in a path extending along a side of said body which revolves substantially about a quarter of the circumference of the body, said slot connecting said chamber with the exterior of said body and providing for entry of said other line into said lower bore.

4. The combination of claim 3, wherein said walls of said chamber defining said upper seat taper progressing towards said upper bore to accommodate seating in said upper seat of a nubbin formed by a knot in said hauling line.

* * * * *